United States Patent Office 3,511,792
Patented May 12, 1970

3,511,792
UNSATURATED POLYESTER RESINS FORMED BETWEEN POLYMERIC FATTY ALCOHOLS AND POLYCARBOXYLIC ACIDS
Dietrich Helm and Eugen Griebsch, Unna, Germany, assignors to Schering AG, Berlin, Germany
No Drawing. Filed July 7, 1967, Ser. No. 651,674
Claims priority, application Germany, July 9, 1966, Sch 39,241
Int. Cl. C08f 21/02; C09d 3/68
U.S. Cl. 260—22                                                                            2 Claims

ABSTRACT OF THE DISCLOSURE

Unsaturated polyester resins formed between polymeric fatty alcohols and polycarboxylic acids necessarily including $\alpha,\beta$-unsaturated acids, hardenable compositions comprising these resins and copolymerizable ethylenically unsaturated monomers such as styrene or vinyl toluene, and resinous materials formed by curing these hardenable compositions with a free-radial forming catalyst such as an organic peroxide.

---

The present invention relates to unsaturated polyester resins, to hardenable compositions containing the same, to resinous materials formed by curing said compositions, and to methods for making said resins, compositions, and cured resinous materials.

It is known in the art that hard synthetic resinous materials can be prepared by the copolymerization of monomeric vinyl compounds, such a styrene or acrylates, with so-called unsaturated polyester resins comprising polyalcohols such as propylene glycol and diethylene glycol and (a) $\alpha,\beta$-ethylenically unsaturated dicarboxylic acids, for example maleic acid and fumaric acid, and optionally (b) polycarboxylic acids such as phthalic acid and adipic acid. These resinous materials have found many uses, particularly as coatings and in glass fiber-reinforced structures such as laminates.

Elastic resinous materials can be prepared from similar commercially available unsaturated polyester resins in which the proportion of $\alpha,\beta$-unsaturated dicarboxylic acid is decreased. The mechanical strength of these elastic resinous materials is considerably reduced in comparison to that of the hard resinous materials. However, the principal disadvantage of these elastic materials is their high water absorption and, as a consequence, their low-resistance to hydrolysis. For example, even after a few hours' treatment of the commercial products in boiling water, crack formation and decomposition occur. Because of these disadvantageous properties, these elastic resinous materials prepared from unsaturated polyester resins are unsuitable in many uses, for example in the electrical field and for use as water-resistant coatings.

The present invention relates to novel unsaturated polyester resins and to hardenable compositions containing the same in combination with one or more copolymerizable ethylenically unsaturated monomers, particularly styrene and vinyl toluene, optionally together with fillers and other conventional additives. These compositions can be cured by addition of a free radical catalyst, particularly an organic peroxide, to form hard or elastic synthetic resinous materials not having the disadvantageous properties of prior art materials.

In particular, the unsaturated polyester resins of the invention comprise as their polyalcohol component a polymeric fatty alcohol which can optionally be pre-reacted with aldehydes, with alkylene oxides, or with lactones, particularly epsilon-caprolactone, respectively to form acetals, ether-alcohols, or ester-alcohols, all of increased chain length.

According to a special embodiment of the invention, the end groups of the unsaturated polyester resin molecule have the formula —O—CO—CH=CH—COOR, wherein R represents hydrogen or an alkyl, cycloalkyl, or aralkyl group which can also be substituted.

The polymeric fatty alcohols contained in the unsaturated polyester resins of the present invention can be obtained, for example, from poly-unsaturated fatty alcohols by polymerization in the presence of weak alkalis, optionally in the presence of polymerizable mono-unsaturated alcohols. For example, German patent publication 1,207,371, incorporated herein by reference, teaches polymeric fatty alcohols prepared by polymerizing unsaturated fatty alcohols having at least 12 carbon atoms and including at least 5 percent of poly-olefinically unsaturated fatty alcohols, preferably by polymerizing poly-olefinically unsaturated fatty alcohols having 16–24 carbon atoms. Unreacted monomeric fatty alcohol can be more or less completely removed after polymerization before the polymeric fatty alcohol is further reacted to form an unsaturated polyester resin.

Polymeric fatty alcohols useful in the present invention can advantageously also be obtained by the hydrogenation of polymeric polycarboxylic fatty acids or of their lower alkyl esters, or by the conversion of the carboxyl groups of these substances into hydroxyl groups by means of other reducing agents. U.S. Pat. 2,347,562 incorporated herein by reference teaches the production of such fatty alcohols by the catalytic hydrogenation, over copper chromite or zinc chromite, of polyene fatty acids or their esters. For example, fatty alcohols are prepared from polymers of tung oil fatty acid esters and from esters of the fatty acids of dehydrated castor oil, soya bean oil, and the like.

The polymeric polycarboxylic fatty acids or fatty acid esters can in turn be obtained by the homopolymerization of mono- and/or poly-unsaturated fatty acids or their esters or by their copolymerization with other monomers. Homopolymerization can be carried ut thermally, preferably in the presence of catalysts. Polymerization processes and products of this type are disclosed in the following U.S. patents, incorporated herein by reference: 2,482,761; 2,731,481; 2,793,219; 2,793,220; 2,955,121; 3,059,003; 3,076,003; 3,100,784; and 3,157,681. In general the polymerization preferably involves fatty acids having 10 to 22 carbon atoms derived from animal, vegetable, mineral, or synthetic sources. Homopolymeric fatty acids obtained in this manner predominantly comprise dimeric fatty acids together with portions of trimeric and monomeric fatty acids.

The preparation of polymeric fatty acids by copolymerization can take place by other methods, particularly in the presence of catalysts. U.S. Pat. 3,271,432 incorporated herein by reference teaches the ionic copolymerization of fatty acids and their esters with aromatic vinyl compounds. Conjugated unsaturated fatty acids or their esters are preferred for this purpose. Styrene, $\alpha$-methyl styrene, or vinyl toluene are employed as copolymerizable compounds.

Throughout the specification and claims, the term "polymeric fatty alcohols" is meant to include difunctional and polyfunctional alcohols in which two or more fatty alcomolecules are linked directly or by bridging members, includes chain-lengthened polyalcohols of the kind closed immediately below.

Polymeric fatty alcohols having chains lengthened by tal formation are suitably obtained by the condensation of polymeric fatty alcohols with aldehydes such as maldehyde, benzaldehyde, or the like, in the presence acid catalysts such as sulfuric acid, p-toluene sulfonic d, or the like, in such an equivalence ratio that prods having free hydroxy groups result. Chain lengthening also occur by reaction of one or more mols of an ylene oxide such as ethylene oxide or propylene oxide h each hydroxyl group of a polymeric fatty alcohol, ereby ethers having free hydroxy groups are produced. o, by reaction of polymeric fatty alcohols with lactes, hydroxy-terminated esters of longer chain length produced.

As α,β-unsaturated dicarboxylic acids, maleic acid or aric acid are preferably incorporated into the polyr resins of the present invention for reasons of econy. Cured resinous materials of particular hardness are ained with fumaric acid. On the other hand, for elastic erials the cheaper maleic acid anhydride is advanously used. The amount of α,β-unsaturated dicarylic acid suitably is 20 to 100 equivalent percent of total content of polycarboxylic acids in the polyester n.

olycarboxylic acids which can be incorporated, alone in combination, by condensation into the polyester ns of the invention together with the α,β-unsaturated rboxylic acids include, for example, the saturated ar or branched aliphatic dicarboxylic acids with 4 to C atoms conventionally employed, such as succinic l, adipic acid, azaleic acid, sebacic acid, dimethyladipic l, trimethyl adipic acid, 9- or 10-carboxy-stearic acid; er molecular aliphatic acids as polymeric fatty acids the kind described earlier herein; aromatic polycarylic acids with 8 to 20 C atoms, as phthalic acid, isoalic acid, terephthalic acid, tetrachlorphthalic acid, ren-bis propionic acid, trimellitic acid, hydroaromatic rcarboxylic acids with 8 to 20 C atoms as tetrahydroalic acid, 3,6-endomethylene tetrahydrophthalic acid t acid), and the like.

n addition to the polymeric fatty alcohols, one or more r polyalcohols can be incorporated by condensation the polyesters of the present invention in amounts o 90 equivalent percent of the total polyalcohol con. For example saturated linear and branched aliphatic lcohols with 2 to 20 C atoms such as ethylene glycol, ylene glycol, triethylene glycol, 1,2- and 1,3-propylglycol and dipropylene glycol, butanediol, hexane-, neopentylglycol, and higher linear or branched chain lcohols, can be used, as well as sulfur-containing aliic di-alcohols such as thiodiethylene glycol, cycloatic di-alcohols with 6 to 20 C atoms such as 1,4-ethylolcyclohexane and the like, and araliphatic dihols with 8–20 C atoms such as bis (hydroxyethoxyyl)-propane and 1,4-di(hydroxyethoxy)-benzene.

he preparation of the unsaturated polyester resin eeds by introducing all the raw materials into a re)n vessel substantially at the same time, condensing sterification until the acid number and hydroxy numhave reached desired values which determine the ave molecular weight, which will lie between 750 and for the polyester resins of the invention.

a special embodiment of the invention which is of icular significance for the production of elastic cured ious materials, practically all the end groups of the ester have the formula

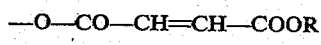

rein R is hydrogen or alkyl, cycloalkyl, or aralkyl ng up to 20 carbon atoms. These end groups are red from α,β-unsaturated dicarboxylic acids such as ic acid or fumaric acid, or from their mono-esters or anhydrides, and can be introduced into the polyester molecule in different ways.

In general, in this embodiment of the invention a polyester containing practically only hydroxy groups as terminals is first prepared from a polymeric fatty alcohol and other optional short-chain polyalcohols and one or more dicarboxylic acids under conditions favoring polycondensation. The hydroxy terminals preferably are then reacted with one mol of maleic acid anhydride per mol of hydroxy groups using conditions under which no transesterification occurs, that is at temperatures of 100°–150° C., for example. In this case, the radical R in the general formula for the end groups of the polyesters represents hydrogen. The free carboxy groups can then be converted more or less completely into ester groups (R other than hydrogen) by reaction with monohydric alcohols under conditions under which no transesterification takes place, for example at temperatures of about 180° C.

In an alternative procedure, a polyester having terminal hydroxy groups is first prepared from polymeric fatty alcohols and dicarboxylic acids and the terminals are subsequently condensed with a monoalkyl-, monocycloalkyl-, or monoaralkyl-ester of an α,β-unsaturated dicarboxylic acid. In this case also, conditions are employed which bring about substantially only condensation, that is particularly with exclusion of such catalysts as promote transesterification. If the water of reaction released by the condensation is continually removed, for example by operation in vacuum or by azeotropic distillation, and transesterification catalysts are excluded, this further condensation can take place at temperatures of 150°–200° C., for example. Catalysts such as metal oxides, or entraining agents which promote the condensation reaction can, of course, be used. When the α,β-unsaturated dicarboxylic acid portion is present in the polyester as a diester, it should preferably be in the trans-form, for example in the form of fumaric acid units, as completely as possible.

When polymeric fatty alcohols having chains lengthened by ether or acetal formation or by reaction with an alkylene oxide are employed, unsaturated polyesters useful according to the invention are obtained merely by the addition of maleic acid anhydride to the free hydroxyl groups thereof, as described above. Further, the simplest polyester according to the present invention, which to be sure will have a relatively high acid number, is obtained when maleic acid anhydride is added to the hydroxy groups of a polymeric fatty alcohol.

If the unsaturated polyesters of the invention are prepared using polymeric fatty alcohols which have been obtained by the dimerization of highly unsaturated fatty alcohols, such as linseed oil, they can be cured with peroxides in the presence of a siccative accelerator to obtain tack-free surfaces.

These polyester resins comprising polymeric fatty alcohols obtained by hydrogenation can optionally be modified by known techniques, for example by introducing unsaturated components such as allyl ether groups or poly-unsaturated fatty acids such as linoleic acid, or by admixing small amounts of air-drying components such as alkyd resins, linseed oil, linoleylmonomaleate, trimethylolpropane diallyl ether, and the like.

On hardening compositions containing such resins in the presence of accelerators simultaneously acting as siccatives, such as cobalt salts, the already-small air-inhibition is further reduced and the surface becomes tackfree. Substances soluble in hardenable compositions comprising ethylenically unsaturated monomers and the unsaturated polyester resins of the present invention, but which become incompatible during polymerization and which come out of the compositions to form an air-barrier on the surface of films of the compositions, can be used for the same purpose.

The ethylenically unsaturated monomers which are copolymerized with the unsaturated polyester resins are vinylaromatic compounds, preferably, styrene, divinylbenzene, and vinyl toluene, or mixtures of these aromatic vinyl compounds with other vinyl compounds such as the acrylates, methacrylates, and allyl compounds. The amount of unsaturated monomer should be 10 to 90 percent by weight of the total amount of unsaturated monomer and unsaturated polyester. Preferably 20 to 40 percent by weight of monomer is employed. However, considerably larger amounts are also possible, depending on the intended field of use.

By the inclusion of larger amounts of materials such as acrylates, methacrylates, or the monomaleates or mono- or di-fumarates of monohydric straight chain or branch chain alcohols preferably having more than four carbon atoms and which can also contain ether linkages, residual shrinkage after gelation can effectively be combatted. In unsaturated polyesters modified in this manner according to the present invention, the equivalence ratio of the double bonds derived from $\alpha,\beta$-unsaturated dicarboxylic acids to those derived from ethylenically unsaturated monomers may be up to 1.5:1.

Fillers or pigments can be incorporated into the curable compositions comprising the unsaturated polyester resins and unsaturated monomers in order to vary or improve their working or final properties, or in order to minimize shrinkage on curing. Suitable exemplary fillers and pigments include: carbonates such as calcium and magnesium carbonate; oxides such as magnesium oxide, aluminum oxide, antimony oxide, iron oxide, and titanium dioxide; silicic acid, for example quartz powder; silicates such as magnesium silicate; asbestos, talc, and other aluminates; carbon black; and the like, as well as mixtures of such substances. The amount of filler used can vary over a wide range. With certain fillers or pigments, particularly those of the surface-modifying type, strength, and extensibility can be considerably improved. The resins of the present invention can also be used in combination with glass fibers. Further, the usual agents for introducing thioxotropic properties, such as silicic acid gels, can be incorporated.

So long as compatibility is present, the unsaturated polyester resins prepared according to the present invention can also be admixed with known unsaturated polyester resins comprising short-chain dicarboxylic acids.

Copolymerization of a mixture of unsaturated monomer and unsaturated polyester resin is generally effected by free radical forming catalysts, i.e. particularly by organic per compounds such as benzoyl peroxide, di-t-butyl peroxide, lauroyl peroxide, t-butyl perbenzoate, cumol hydroperoxide, cyclohexanone peroxide, and methyl-ethyl ketone peroxide, or by mixtures of these per compounds by organic azo compounds, such as azo-bis(isobutyronitrile). Known accelerators such as tertiary amines and cobalt or vanadium salts of organic acids can be employed with the peroxides, optionally in combination with mercaptans such as lauryl mercaptan and the like.

The hardenable compositions according to the present invention containing unsaturated polyester resins are suitable for the preparation of hard to quite elastic cast bodies. Further, they can be employed for the preparation of filled or unfilled formed bodies and laminates, surface coatings, and adhesive compounds.

A better understanding of the present invention can be had by referring to the following specific examples, given by way of illustration. In the examples, parts by weight are referred to. The resin properties given in the examples were in each case determined three weeks after curing.

EXAMPLE 1

In a reaction vessel provided with a stirrer and a descending condenser with receiver, 1000 parts of a polymeric fatty alcohol, 177 parts of 2,2-dimethyl-propane diol, 315 parts by weight of maleic acid anhydride, and 0.05 part of t-butyl-catechol were slowly heated to 200° C. in a nitrogen atmosphere with distillative removal of the water of reaction. The mixture was kept at this temperature for 8 hours, toward the end of which a vacuum of about 50 mm./Hg was applied.

The fatty alcohol employed was obtained by hydrogenation of a commercial dimeric tall oil fatty acid. The alcohol had a hydroxyl number of 195 and a monomer- and trimer-content of 10 and 15 percent, respectively.

The reaction product had an acid number of 26. It was dissolved in styrene to form a 70 percent solution which was combined with 2 percent by weight of methyl-ethyl-ketone peroxide (40 percent) and, subsequently, with 1 percent by weight of a solution of cobalt octoate (1 percent cobalt). After about 1 hour at room temperature, gelation occurred.

The cured material had the following properties:

Hardness (Shore A): 83
Tensile strength: 114 kg./cm.$^2$
Extension at break: 50 percent The water absorption of the material was only 0.5 percent. After several hours' boiling in water or in 10 percent hydrochloric acid, the material was unchanged.

EXAMPLE 2

In an apparatus like that in Example 1, 324 parts of a polymeric fatty alcohol of the type described in Example 1 and 47.5 parts of fumaric acid were heated to about 190° C. in the presence of 0.02 part of t-butyl-catechol with distillative removal of the water of reaction. The mixture was held at this temperature for 20 hours. Toward the end of the reaction, a vacuum was applied for one hour. The reaction product, which had an acid number of 2.8 and a hydroxy number of 43.4, was stirred at 100° C. for one hour with 0.01 part of t-butyl-catechol and 25 grams of maleic acid anhydride, whereupon its acid number reached 33.

The product was dissolved in styrene to form a 70 percent solution. This was combined first with 3 percent by weight of a 10 percent solution of dimethyl aniline in styrene and subsequently with 4 percent by weight of a 50 percent benzoyl peroxide paste and then left to harden.

A hardened casting had the following properties:

Hardness (Shore A): 98
Tensile strength: 120 kg./cm.$^2$
Extension at break: 20 percent

EXAMPLE 3

850 parts of a polymeric fatty alcohol of the type described in Example 1 and 500 parts of a commercial dimeric fatty acid having a monomer- and trimer-content of 3 percent and 16 percent respectively and a saponification number of 198 were heated to 220° C. with distillative removal of the water of reaction. The mixture was maintained for eight hours at this temperature under a vacuum of 50 mm./Hg. The product, which had an acid number of 2.5 and a hydroxy number of 50, was reacted for one hour at 150° C. with 107 parts of maleic acid anhydride in the presence of 0.03 part of t-butyl-catechol. The acid number of the addition product was 45.

The unsaturated polyester was dissolved in styrene to give a 70 percent solution and stirred first with 1 percent by weight of a commercial 4-butyl-hydroperoxide with subsequent addition of 0.5 percent by weight of a vanadium accelerator solution.

After hardening, the elastic material had the following properties:

Hardness (Shore A): 82
Tensile strength: 50 kg./cm.$^2$
Extension at break: 84 percent The material was extraordinarily resistant to hydrolysis. Even hour-long boiling with a 10 percent sodium hydroxide solution produced almost no change.

EXAMPLE 4

1190 parts of a polymeric fatty alcohol like that employed in Example 1 were heated to 230° C. with 400 parts of fluorene-9,9-bis(β-propionic acid) with distillative removal of the water of reaction. The mixture was held at this temperature for 15 hours with the application of vacuum for the last hour. The resulting polyester had an acid number of 2 and a hydroxy number of 54. It was combined at 100° C. with 0.03 parts of t-butylcatechol and then stirred with 135 parts by weight of maleic acid anhydride for one hour.

The unsaturated polyester so obtained, having an acid number of 46, was dissolved in styrene to give a 70 percent solution. This was stirred with 1 percent by weight of a cobalt octoate solution (1 percent) and 2 percent by weight of a 40 percent solution of methyl-ethyl-ketone peroxide, and then was left to gel and cure.

The cured material had the following properties:

Hardness (Shore A): 95
Tensile strength: 122 kg./cm.²
Extension at break: 50 percent

EXAMPLE 5

56 parts of a dimeric fatty alcohol having a hydroxy number of 202 and obtained by hydrogenation of a distilled commercial dimeric soya oil fatty acid having a monomer- and trimer-content of 1 and 3 percent respectively were heated to boiling with 19 parts of paraformaldehyde, 200 parts of xylene, and 2 parts of 2-normal sulfuric acid for two hours with partial reflux and separation of the water of reaction. 13.6 grams of water were recovered. After cooling to about 50° C., the mixture was neutralized with about 2 parts of 2-normal sodium hydroxide and the xylene was removed by distillation in vacuum. The hydroxy group-containing polyformacetal of the dimeric fatty-alcohol had a hydroxy number of 420 parts of the polyformacetal were combined with 1 part of t-butyl-catechol, into which mixture 36 parts of maleic acid anhydride were stirred for one hour at 100° C.

The product was dissolved in styrene to give a 70 percent solution which was cured with 0.5 percent by weight of cobalt naphthenate solution (cobalt content of 1 percent) and 1 percent by weight of methyl-ethyl-ketone peroxide.

The cured material had the following properties:

Hardness (Shore A): 86
Tensile strength: 60 kg./cm.²
Extension at break: 65 percent After ten hours' boiling in 10 percent sodium hydroxide solution, the surface of the material was lightly roughened, but otherwise unchanged.

EXAMPLE 6

336 parts of a dimeric fatty alcohol having a hydroxy number of 202 and obtained by hydrogenation of a distilled commercial dimeric soya oil fatty acid having a monomer content of 1 percent and a trimer content of 2 percent were heated for 8 hours at 220° C. under a vacuum of 50 mm./Hg with 200 parts of adipic acid. 95.2 parts of maleic acid anhydride were added to this intermediate ester at 100° C. after the addition of 0.04 part hydroquinone. An unsaturated polyester having an acid number of 46 was obtained.

The unsaturated polyester was dissolved in styrene to form a 60 percent solution. This was stirred with 2 percent by weight of a 10 percent solution of dimethyl aniline in styrene and 4 parts of a 50 percent benzoyl peroxide paste, and then left to cure.

The cured material had the following properties:

Hardness (Shore A): 79
Tensile strength: 78 kg./cm.²
Extension at break: 125 percent

EXAMPLE 7

The unsaturated polyester of Example 6 was dissolved in vinyl toluene to form a 60 percent solution which was then cured with 1 percent by weight each of solutions of cobalt naphthenate (1 percent) and of methyl-ethyl-ketone peroxide (40 percent).

A material having the following properties resulted:

Hardness: (Shore A): 68
Tensile strength: 63 kg./cm.²
Extension at break: 130 percent

EXAMPLE 8

44 parts of ethylene oxide were dropped into 273 parts of a dimeric fatty alcohol having a hydroxy number of 204 and obtained by hydrogenation of a commercial dimeric tall oil fatty acid having a monomer and trimer content of 10 and 16% respectively and containing 0.5 part of borontrifluoride-etherate, while the temperature of the mixture was maintained at 30 to 40° C. The mixture was washed with hot water (about 90° C.) and dried under vacuum at about 100° C. The ethylene oxide lengthened polymeric fatty alcohol had a hydroxy number of 172.

183 parts of the ethylene oxide lengthened polymeric fatty alcohol and 25 parts of adipic acid were heated under nitrogen to 200° C. for 8 hours with removal of the water of reaction and under a vacuum of about 50 mm. Hg. The resulting polyester had an acid number of 3 and a hydroxyl number of 71. It was combined at 100° C. with 0.01 part of thymoquinone and then stirred with 23.5 parts of maleic acid anhydride for 1 hour at 100–120° C.

The unsaturated polyester so obtained, having an acid number of 63, was dissolved in styrene to give a 70 percent solution. This was stirred with 2% by weight of t-butyl perbenzoate and heated for 3 hours at 110–120° C.

The cured material had the following properties:

Hardness (Shore A): 64
Tensile strength: 32 kg./cm.²
Extension at break: 75 percent

What is claimed is:
1. A hardenable composition comprising a mixture of (1) a resinous unsaturated polyester condensation polymer formed between (A) a polycarboxylic acid component comprising 20 to 100 equivalent percent of an α,β-unsaturated dicarboxylic acid and up to 80 equivalent percent of a member selected from the group consisting of saturated linear and branched aliphatic dicarboxylic acids having 4 to 20 carbon atoms, polymeric fatty acids, aromatic polycarboxylic acids having 8 to 20 carbon atoms, and hydroaromatic polycarboxylic acids having 8 to 20 carbon atoms; and (B) a polyhydroxylic component comprising 10 to 100 equivalent percent of a polymeric fatty alcohol and up to 90 equivalent percent of a member selected from the group consisting of saturated linear and branched aliphatic di-alcohols, sulfur-containing aliphatic di-alcohols, cycloaliphatic di-alcohols having 6 to 20 carbon atoms, and araliphatic di-alcohols having 8 to 20 carbon atoms, with (2) 10 to 90 percent, by weight of the mixture, of styrene.

2. A cured resinous material comprising the polymerization product of a mixture of (1) a resinous unsaturated polyester condensation polymer formed between (A) a polycarboxylic acid component comprising 20 to 100 equivalent percent of an α,β-unsaturated dicarboxylic acid and up to 80 equivalent percent of a member selected from the group consisting of saturated linear and branched aliphatic dicarboxylic acids having 4 to 20 carbon atoms, polymeric fatty acids, aromatic polycarboxylic acids having 8 to 20 carbon atoms, and hydroaromatic polycarboxylic acids having 8 to 20 carbon atoms; and (B) a polyhydroxylic component comprising 10 to 100 equivalent percent of a polymeric fatty alcohol and up to 90 equivalent percent of a member selected from the group consisting of saturated linear and branched aliphatic di-alcohols, sulfur-containing aliphatic di-alcohols, cycloaliphatic di-alcohols having 6 to 20 carbon atoms and araliphatic di-alcohols having 8 to 20 carbon atoms, with (2) 10 to 90 percent, by weight of the mixture, of styrene.

References Cited

UNITED STATES PATENTS

| 2,347,562 | 4/1944 | Johnston | 260—617 |
|---|---|---|---|
| 2,413,612 | 12/1946 | Eckey et al. | 260—617 |
| 3,039,980 | 6/1962 | Mallison | 260—22 |
| 3,123,578 | 3/1964 | Kraft | 260—22 |
| 3,158,584 | 11/1964 | Layman | 260—22 |
| 3,268,462 | 8/1966 | Bruin et al. | 260—22 |
| 3,374,208 | 3/1968 | Seiner et al. | 260—22 |
| 3,375,301 | 3/1968 | Case et al. | 260—22 |

FOREIGN PATENTS 646,071    7/1962    Canada.

DONALD E. CZAJA, Examiner

R. W. GRIFFIN, Assistant Examiner

U.S. Cl. X.R.

117—126, 161, 167; 260—23, 40, 75, 861, 862, 871